United States Patent
Bhatia et al.

(10) Patent No.: US 8,416,894 B2
(45) Date of Patent: Apr. 9, 2013

(54) TIMING SIGNAL FREQUENCY MANAGEMENT METHODS AND APPARATUSES

(75) Inventors: Ashok Bhatia, San Diego, CA (US);
Dominic Gerard Farmer, Los Gatos, CA (US); Emilija M. Simic, La Jolla, CA (US); Vishal Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 12/471,183

(22) Filed: May 22, 2009

(65) Prior Publication Data

US 2010/0296551 A1    Nov. 25, 2010

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. .................................................. 375/346
(58) Field of Classification Search .................. None
See application file for complete search history.

(56) References Cited

U.S. PATENT DOCUMENTS

| 6,684,158 B1 | 1/2004 | Garin et al. |
| 2007/0066231 A1* | 3/2007 | Duffett-Smith et al. ... 455/67.11 |
| 2007/0132636 A1 | 6/2007 | Young et al. |

FOREIGN PATENT DOCUMENTS

WO    WO03100454    12/2003

OTHER PUBLICATIONS

International Search Report and Written Opinion—PCT/US2010/035222, International Search Authority—European Patent Office—Aug. 10, 2010.

* cited by examiner

*Primary Examiner* — David C. Payne
*Assistant Examiner* — Wednel Cadeau
(74) *Attorney, Agent, or Firm* — Thien T. Nguyen (57) ABSTRACT

Methods and apparatus are provided for use in devices operatively enabled to establish timing signal offset data and/or utilize such established offset data.

55 Claims, 2 Drawing Sheets

TIMING SIGNAL FREQUENCY MANAGEMENT METHODS AND APPARATUSES

BACKGROUND

1. Field

The subject matter disclosed herein relates to electronic devices, and more particularly to methods and apparatuses for use in providing frequency correction of a timing signal that may be utilized by one or more system interfaces within an electronic device.

2. Information

Wireless communication systems and devices are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity between a plethora of devices, both fixed and portable. Many of these wireless systems are coupled together through other communication systems and resources to promote even more communication and sharing of information. Indeed, it is not uncommon for some devices to be operatively enabled to communicate with more than one wireless communication system and this trend appears to be growing.

Another popular and increasingly important wireless technology includes navigation systems and devices and in particular satellite positioning systems (SPS) such as, for example, the global positioning system (GPS) and other like Global Navigation Satellite Systems (GNSS). An SPS receiver may, for example, receive wireless SPS signals that are transmitted by a plurality of orbiting satellites of a GNSS. The SPS signals once received may be processed, for example, to determine a global time, an approximate geographical location, altitude, and/or speed associated with a device having the SPS receiver path.

These exemplary wireless devices and/or other similar electronic devices may be enabled to operate, at least in part, based on a local timing signal. However, in many devices the frequency of such a timing signal may drift and/or otherwise experience errors. For example, a timing signal generated by certain oscillator circuits may be affected by changes in temperature. As such, some timing circuits employ temperature compensation circuitry (e.g., voltage controlled) to mitigate or otherwise reduce errors, such as, e.g., frequency errors in the timing signal. It is also known to make further adjustments to a timing signal in an attempt to synchronize the local timing signal with a received signal. For example, an error or difference, e.g., frequency offset information, may be determined by comparing a received signal and/or signal information derived from such a received signal to a local timing signal and/or signal information associated with such local timing signal. This offset information may be used to correct or otherwise adjust the local timing signal, for example.

SUMMARY

In accordance with certain aspects of the present description exemplary techniques are provided which may be implemented in various methods and/or apparatuses to establish timing signal frequency offset data that may be based, at least in part, on offset information associated with a plurality of system interfaces. By way of example but not limitation, a method and/or apparatus may be provided to access offset information associated with each of a plurality of system interfaces with respect to a local timing signal, establish offset data associated with the local timing signal based, at least in part, on at least a portion of such available offset information and (optionally) corresponding uncertainty information. At least one of the system interfaces may be operated in some manner based, at least in part, on the established offset data. For example, the established offset data may be used to operatively correct the frequency of the local timing signal for use in a wireless system interface (e.g., an SPS interface, etc.). For example, such established offset data may be used in a frequency converting circuit within an RF front-end circuit. It should be understood, however, that this is merely an example implementation, and that claimed subject matter is not limited in this respect.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

In accordance with certain aspects of the present description, exemplary techniques are provided which may be implemented in various ways to establish and/or otherwise access offset information associated with each of a plurality of system interfaces with respect to a local timing signal, establish offset data associated with the local timing signal based, at least in part, on at least a portion of such available offset information and (optionally) corresponding uncertainty information, and operate at least one of the system interfaces based, at least in part, on the established offset data, for example, by operatively correcting a frequency of the local timing signal within at least one system interface based, at least in part, on the established offset data.

In accordance with one aspect of the present description a method may be provided that includes accessing offset information, such as, for example, timing signal frequency error information for a plurality of system interfaces. Here, for example, a method may include accessing first offset information associated with a first system interface and second offset information associated with at least a second system interface. The method may include establishing offset data based, at least in part, on at least one of the first offset information and/or the second offset information, and operating at least one of the first system interface and/or the second system interface based, at least in part, on the established offset data. For example, a frequency of a local timing signal as used within at least the first system interface may be adjusted based, at least in part, on the established offset data.

The established offset data may, for example, include an estimated frequency error associated with a local timing signal, for example, as may be generated by a controlled oscillator circuit and/or the like.

In certain example implementations, such a first system interface may include a first wireless system interface that may be enabled to establish corresponding first offset information based, at least in part, on a received first wireless system signal and a local timing signal. The second offset information may also be based, at least in part, on such local timing signal. Indeed, while not necessary, in certain example implementations the second system interface may include a second wireless system interface, and the second offset information may be based, at least in part, on a received second wireless system signal and the local timing signal.

The method may also include identifying uncertainty information for each of at least the first offset information and the second offset information, and establishing the offset data based, at least in part, on such uncertainty information. For example, uncertainty information may be based, at least in part, on an age associated with at least one of the first offset information and/or the second offset information, an operating state/parameter associated with a corresponding system interface, a condition associated with a corresponding apparatus/device, and/or other like factors.

The method may include establishing the offset data by comparing and/or combining a plurality of offset information to establish compared and/or combined offset information, and establishing the offset data based, at least in part, on the compared and/or combined offset information.

In certain exemplary methods, a first system interface may include an SPS signal receiver and the method(s) may include operatively enabling a frequency converting circuit and/or the like within the SPS signal receiver based, at least in part, on the established offset data. For example, a frequency correcting circuit may be provided within an RF front-end circuit that acquires and/or otherwise processes received SPS signals.

In accordance with certain other aspects of the present description an apparatus may be provided. By way of example but not limitation, such an apparatus may take the form of one or more devices, and/or one or more circuits, circuit boards, circuit components, and/or one or more programmable processing units, memory, instructions, etc. In an example implementation, an apparatus may include a timing circuit operatively enabled to generate a local timing signal, at least first and second system interfaces operatively coupled to the timing circuit, and a frequency manager. The frequency manager may be operatively enabled to access at least first offset information associated with the first system interface and second offset information associated with the second system interface, and establish offset data based, at least in part, on at least one of the first offset information and/or the second offset information. At least one of the first system interface and/or the second system interface may be operatively enabled to operate using the local timing signal based, at least in part, on the established offset data.

In accordance with certain aspects of the present description an apparatus may be provided that includes means for accessing first offset information associated with a first system interface, means for accessing second offset information associated with at least a second system interface, means for establishing offset data based, at least in part, on at least one of the first offset information and/or the second offset information, and means for operating at least one of the first system interface and/or the second system interface based, at least in part, on the established offset data.

In accordance with still other aspects of the present description an article of manufacture may be provided. Here, for example, such article may include a computer readable medium having stored thereon computer implementable instructions that if implemented by one or more processing units operatively enable the one or more processing units to access at least first offset information associated with a first system interface and second offset information associated with a second system interface, and establish offset data based, at least in part, on at least one of the first offset information and/or the second offset information, the offset data being for use by at least one of the first system interface and/or the second system interface to operatively adjust the local timing signal.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Techniques described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The exemplary methods and apparatuses illustrated herein may be implemented in one or more electronic devices. Examples of such devices herein include navigation and/or communication system interfaces. However, claimed subject matter is not intended to be limited to just these examples.

With regard to certain exemplary navigation system interfaces, a satellite positioning system (SPS) may include a system of transmitters positioned to enable entities to determine their location on the Earth based, at least in part, on signals received from the transmitters. Such a transmitter may transmit a signal marked with a repeating pseudo-random noise (PN) code of a set number of chips and may be located on ground based control stations, user equipment and/or space vehicles. A "space vehicle" (SV) as referred to herein relates to an object that is capable of transmitting signals to receivers on or above the Earth's surface. In one particular example, such an SV may include a geostationary satellite. Alternatively, an SV may include a satellite traveling in an orbit and moving relative to a stationary position on the Earth. However, these are merely examples of SVs and claimed subject matter is not limited in these respects.

In a particular example, such transmitters may be located on SVs such as Earth orbiting satellites. For example, a satellite in a constellation of a Global Navigation Satellite System (GNSS) such as Global Positioning System (GPS), Galileo, Glonass or Compass may transmit a signal marked with a PN code that is distinguishable from PN codes transmitted by other satellites in the constellation.

To estimate a location at a receiver, a navigation system interface may be operatively enabled to determine pseudorange measurements to SVs "in view" of the receiver using well known techniques based, at least in part, on detections of PN codes in signals received from the SVs. Such a pseudorange to an SV may be determined based, at least in part, on a code phase detected in a received signal marked with a PN code associated with the SV during a process of acquiring the received signal at a receiver. To acquire the received signal, a navigation system interface may be operatively enabled to correlate a reference waveform (e.g., received signal) with a generated waveform (e.g., locally generated PN code) associated with an SV. For example, such a navigation system interface may correlate such a received signal with multiple code and/or phase/time shifted versions (replica signals) of such a locally generated PN code. Detection of a particular time and/or code shifted version yielding a correlation result with the highest signal power may indicate a code phase associated with the acquired signal for use in measuring pseudorange as discussed above.

Upon detection of a code phase of a signal received from a GNSS SV, a receiver may form multiple pseudorange hypotheses, e.g., logically associated with a search grid or the like. Using additional information, a receiver may eliminate such pseudorange hypotheses to, in effect, reduce an ambiguity associated with a true pseudorange measurement. With sufficient accuracy in knowledge of timing of a signal received from a GNSS SV, some or all false pseudorange hypotheses may be eliminated.

Once a signal has been acquired, a receiving device may enter into a tracking or other like mode or operation to continue to identify and/or monitor a specific wireless signal within a received reference waveform.

Those skilled in the art will recognize that it may be beneficial to provide such a navigation system interface with a significantly accurate local timing signal.

While the examples herein include navigation signals it should be understood that the methods and apparatuses and techniques provided herein are implementable to other wireless signaling systems, such as, for example, wireless communication systems. Again, claimed subject matter is not intended to be limited to navigation systems.

Figure 1:
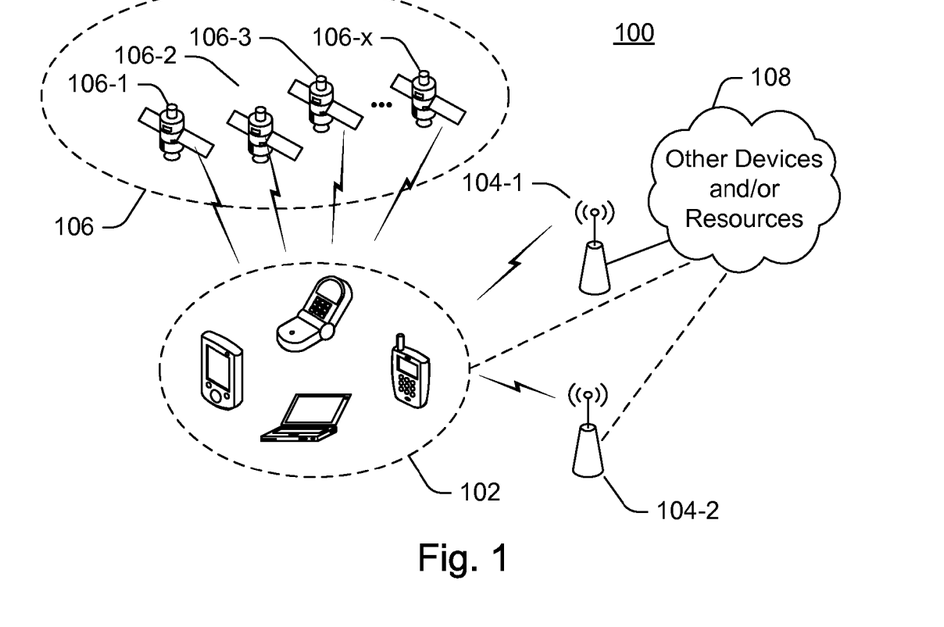
FIG. 1 is a block diagram illustrating an exemplary wireless signaling environment that includes a device operatively enabled to establish timing signal offset data in accordance with an implementation.

With this in mind, FIG. 1 is a block diagram illustrating a wireless environment 100 that may include various computing and communication resources. This example implementation may be operatively enabled to provide at least some form of navigation services in accordance with certain exemplary implementations of present description. This example implementation may also and/or alternatively be operatively enabled to provide at least some form of communication services in accordance with certain exemplary implementations of present description.

As for navigation services, for example, as shown in FIG. 1 an SPS 106 may include a plurality of SVs 106-1, 106-2, 106-3, . . . , 106-x that may transmit SPS signals to a device 102.

By way of example but not limitation, as illustrated using icons in FIG. 1, device 102 may include a mobile device such as a cellular phone, a smart phone, a personal digital assistant, a portable computing device, a navigation unit, and/or the like or any combination thereof. In other exemplary implementations, device 102 may take the form of a machine that is mobile or stationary. In still other exemplary implementations, device 102 may take the form of one or more integrated circuits, circuit boards, and/or the like that may be operatively enabled for use in another device.

In certain implementations wireless environment 100 may further include and/or alternatively include various computing and communication resources operatively enabled to provide communication and/or other information processing services with respect to device 102. Thus, for example, wireless environment 100 may be representative of any system(s) or a portion thereof that may include at least one device 102 operatively enabled to transmit and/or receive wireless signals to/from one or more wireless communication systems 104-1 and/or 104-2.

As illustrated in FIG. 1, wireless communication systems 104-1 and/or 104-2 may be operatively enabled to communicate with and/or otherwise operatively access other devices and/or resources as represented simply by cloud 108. For example, cloud 108 may include one or more communication devices, systems, networks, or services, and/or one or more computing devices, systems, networks, or services, and/or the like or any combination thereof. As further illustrated by the dashed line between device 102 and cloud 108, in certain implementations, device 102 may be operatively coupled to other devices and/or resources through one or more wired, fiber, and/or other like data communication interfaces.

Device 102 may, for example, be operatively enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

Techniques described herein may be used with any one of several SPS' and/or combinations of SPS'. Furthermore, such techniques may be used with positioning determination systems that utilize pseudolites or a combination of SVs and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with system time. Such a transmitter may be assigned a unique PN code so as to permit identification by a remote receiver. Pseudolites may be useful in situations where GPS signals from an orbiting SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals" and/or "SV signals", as used herein, is intended to include SPS-like signals from pseudolites or equivalents of pseudolites.

With this in mind and in accordance with certain aspects, some exemplary methods and apparatuses will now be described, which may be implemented in one or more devices, such as device 102, to establish and utilize timing signal offset data.

Figure 2:
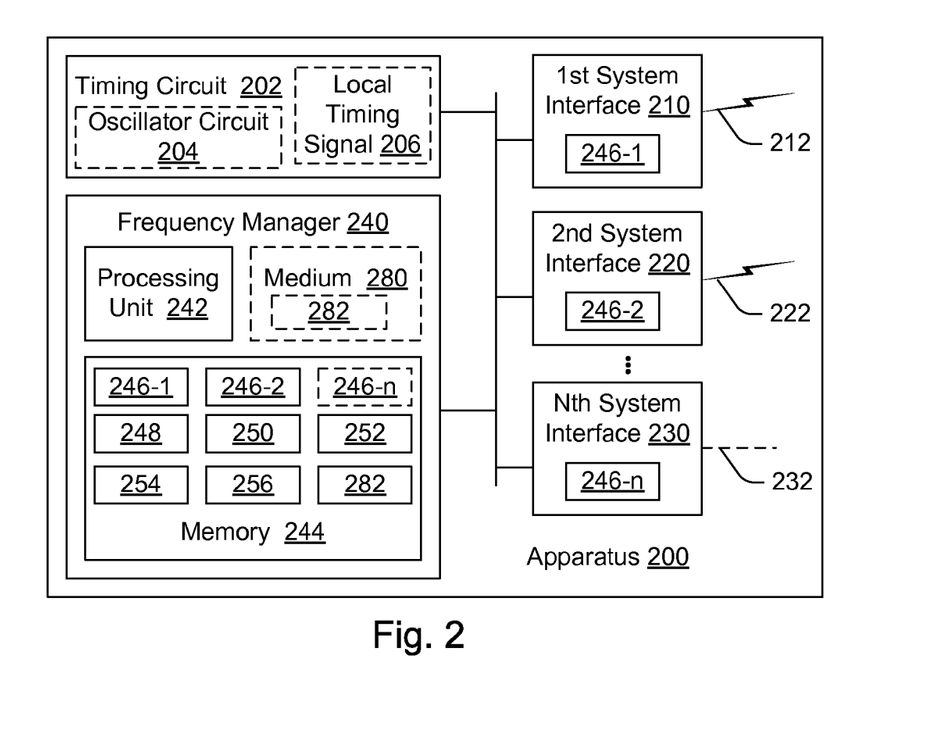
FIG. 2 is a block diagram illustrating certain features of an exemplary device having a plurality of system interfaces and a frequency manager operatively enabled to establish timing signal offset data that may, for example, be implemented in the environment of FIG. 1.

As illustrated in the exemplary block diagram of FIG. 2, an apparatus 200 may be provided for use in device 102. Apparatus 200 may, for example, include at least one timing circuit 202 which may include an oscillator circuit 204 and/or the like which may be used to generate a local timing signal 206. Apparatus 200 may also include a plurality of system interfaces, represented here by a first system interface 210, a second system interface 220, and an $N^{th}$ system interface 230. By way of example, but not limitation, first system interface 210 may include a SPS receiver, second interface 220 may include a wireless network interface, and $N^{th}$ system interface 230 may include another wireless or wired network interface. In certain other example implementations, first and second system interfaces (210 and 220) may each be operatively associated with different wireless signals from one or more transmitters of one or more navigation and/or communication systems. Thus, for example, first system interface 210 may be associated with a first SPS signal and second system interface 220 may be associated with a second SPS signal. Here, in certain examples, the first and second SPS signals may be associated with the same GNSS (e.g., transmitted by separate SVs, and/or have different signal formats) or may be associated with different GNSS.

Apparatus 200 may also include a frequency manager 240, which in this example implementation includes at least one processing unit 242 and memory 244. Here, for example, instructions 282 that may be stored in memory 244 may be implemented by processing unit 242 to provide at least a portion of the functionality presented herein to establish timing signal offset data that may be utilized in some manner by one or more of the plurality of system interfaces. In certain implementations, all or portions of such instructions 282 may be provided to processing unit 242 and/or memory 244 through at least one operatively accessible computer readable medium 280.

In addition to instructions 282, memory 244 may be operatively enabled to store various information/data associated with frequency manager 240, one or more of the plurality of system interfaces, and/or timing circuit 202. For example, as illustrated in FIG. 2, memory 244 may be enabled to store first offset information 246-1 associated with first system interface 210, second offset information 246-2 associated with second system interface 220, and/or $N^{th}$ offset information 246-n associated with $N^{th}$ system interface 230. Memory 244 may be enabled to store further processed information such as, for example, combined offset information 248, compared offset information 250, and/or uncertainty information 256. Memory 244 may also, in certain implementations store resulting data, such as, for example, established offset data 252. Established offset data 252 may, in certain example implementations, comprise estimated frequency error data 254.

Memory 244 may be representative of any data storage mechanism through with information may be stored/accessed as data using one or more signals. Memory 244 may include, for example, a primary memory and/or a secondary memory. Primary memory may include, for example, a random access memory, read only memory, etc. While illustrated in this example as being separate from processing unit 242, it should be understood that all or part of a primary memory may be provided within or otherwise co-located/coupled with processing unit 242. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 280. Here, for example, computer readable medium 280 may include any media that can carry data and/or instructions stored thereon.

Processing unit 242 may be implemented in hardware, or a combination of hardware and software. Processing unit 242 may be representative of one or more circuits configurable to perform at least a portion of a data computing procedure or process. By way of example but not limitation, processing unit 242 may include one or more processors, controllers, microprocessors, microcontrollers, application specific integrated circuits, digital signal processors, programmable logic devices, field programmable gate arrays, and the like, or any combination thereof.

One or more of the plurality of system interfaces may be representative of any wireless system interface. In certain implementations, one or more of the plurality of system interfaces may be representative of any wired and/or other like coupled system interface. For example, as illustrated in FIG. 2 first system interface 210 may be operatively enabled to receive wireless signal 212, second system interface 220 may be operatively enabled to receive wireless signal 222, and $N^{th}$ system interface 230 may be operatively enabled to receive signal 232 which may be wired or wireless.

First system interface 210 may be operatively enabled to determine and/or otherwise estimate first offset information 246-1 based, at least in part, on local timing signal 206 and wireless signal 212. By way of example but not limitation, first offset information 246-1 may include data specifying an estimated frequency error associated with local timing signal 206. First offset information 246-1 may also include other data, such as, for example, a timestamp and/or the like that may be associated with such estimated frequency error. Techniques for estimating and/or otherwise establishing frequency errors are well known and beyond the scope of this application.

Similarly, second system interface 220 may be operatively enabled to determine and/or otherwise estimate second offset information 246-2 based, at least in part, on local timing signal 206 and wireless signal 222. For example, second offset information 246-2 may include data specifying an estimated frequency error associated with local timing signal 206. Second offset information 246-2 may also include other data, such as, for example, a timestamp and/or the like that may be associated with such estimated frequency error. Again, techniques for estimating and/or otherwise establishing frequency errors are well known and beyond the scope of this application.

$N^{th}$ system interface 230 may be operatively enabled to determine and/or otherwise estimate $N^{th}$ offset information 246-n based, at least in part, on local timing signal 206 and signal 232. $N^{th}$ offset information 246-n may, for example, include data specifying an estimated frequency error associated with local timing signal 206. $N^{th}$ offset information 246-n may also include other data, such as, for example, a timestamp and/or the like that may be associated with such estimated frequency error. Once again, techniques for estimating and/or otherwise establishing frequency errors are well known and beyond the scope of this application.

Frequency manager 240 may be operatively enabled to establish timing signal offset data 252 based, at least in part, on the offset information available from the plurality of system interface and/or as stored within memory 244. In certain implementations, frequency manager 240 may also establish and/or otherwise at least access uncertainty information 256, portions of which may correspond to portions of the offset information. Frequency manager 240 may, for example, consider portions of the offset information and/or uncertainty information to establish offset data 252. Frequency manager 240 may, for example, provide established offset data 252 to memory 244 and/or one or more of the plurality of system interfaces.

By way of example, in certain implementations, frequency manager 240 may be operatively enabled to establish combined offset information 248 based, at least in part, on offset information associated with two or more of the plurality of system interfaces. For example, combined offset information 248 may be based, at least in part, on an average and/or selectively weighted average and/or other like mathematical process using offset information associated with two or more of the plurality of system interfaces.

By way of example, in certain implementations, frequency manager 240 may be operatively enabled to establish compared offset information 250 based, at least in part, on offset information associated with two or more of the plurality of system interfaces. For example, compared offset information 250 may be based, at least in part, on a comparison of offset information and/or uncertainty information associated with two or more of the plurality of system interfaces. For example, compared offset information 250 may be based, at least in part, on the most accurate available offset information and/or the least uncertain available offset information.

Thus, by way of example but not limitation, in certain exemplary implementations, frequency manager 240 may be operatively enabled to establish offset data 252 based, at least in part, on at least one of: (1) offset information associated with at least one of the plurality of system interfaces, (2) uncertainty information, (3) combined offset information 248, and/or (4) compared offset information 250.

Figure 3:
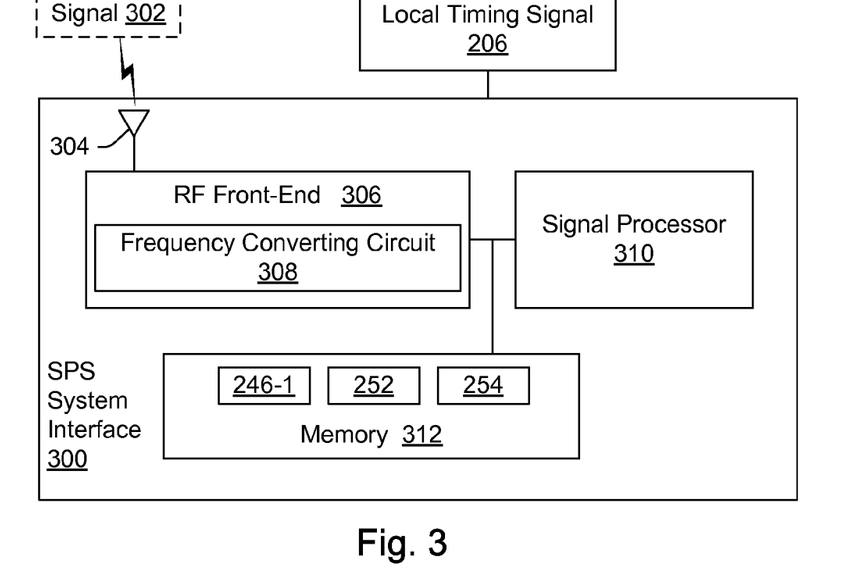
FIG. 3 is a block diagram illustrating certain features of an exemplary SPS system interface that may be operatively coupled to a frequency manager and/or operatively enabled to utilize timing signal offset data that may, for example, be implemented in the device of FIG. 2.

Attention is drawn next to FIG. 3, which is a block diagram illustrating certain features of an exemplary SPS system interface 300 (e.g., a GPS/GNSS receiver) that may, for example, be implemented in first system 210 of FIG. 2.

As illustrated in this example, SPS system interface 300 may include an antenna 304 for receiving an SPS signal 302. Antenna 304 may be coupled to an RF front-end circuit 306 which may process received RF signals and provide corresponding sampled SPS signal data to a signal processor 310, for example. Such interface and receiver technologies are well known and may be of varying designs, the scope of which is beyond the needs of this description.

As illustrated in this example, RF front-end circuit 306 may include frequency converting circuit 308, which may be operatively enabled to determine at least a portion of offset information 246-1, which is illustrated here along with other information/data as being stored in memory 312. Frequency converting circuit 308 may, for example, be further operatively enabled to utilize established offset data 252. For example, frequency converting circuit 308 may utilize an established offset data in the form of an estimated frequency error 254 to correct, adjust, and/or otherwise affect local timing signal 206 for use in RF front-end 306 and/or elsewhere within SPS system interface 300. In certain example implementations, frequency converting circuit 308, as with other "circuits" provided herein, may be implemented in whole or part using programmable circuitry that when enabled through instructions operatively forms a special purpose circuit, which in this example may be employed as a frequency converting circuit.

Figure 4:
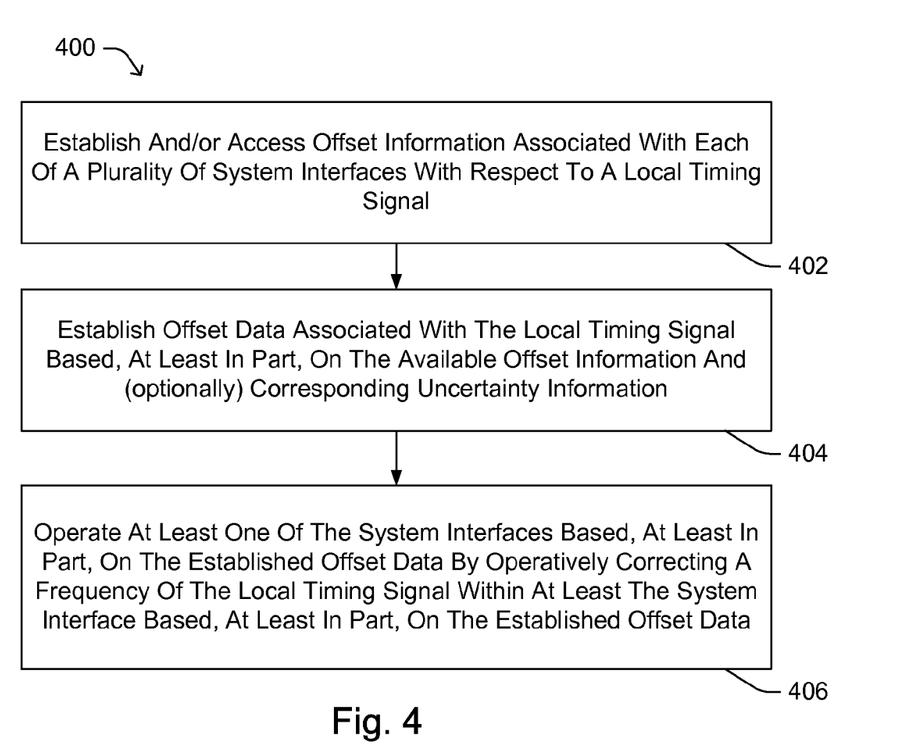
FIG. 4 is a flow diagram illustrating an exemplary method for use in establishing timing signal offset data and utilizing such established offset data that may, for example, be implemented in the environment of FIG. 1 and/or the device of FIG. 2.

Attention is drawn next to FIG. 4, which is a flow diagram illustrating an exemplary method 400 for use in establishing offset data and utilizing such established offset data.

At block 402, offset information associated with each of a plurality of system interfaces with respect to a local timing signal may be established and/or accessed.

At block 404, offset data associated with the local timing signal may be established based, at least in part, on the available offset information and (optionally) corresponding uncertainty information. In certain implementations, for example, offset data may be established based, at least in part, on at least one of: offset information associated with at least one of the plurality of system interfaces, uncertainty information, combined offset information, and/or compared offset information. Thus, for example, uncertainty information may be based, at least in part, on an age (e.g., timestamp, etc.) associated with corresponding offset information, an operating state/parameter (e.g., mode, status, etc.) associated with a corresponding system interface, and/or a condition associated with a corresponding apparatus/device (e.g., movement, velocity, etc.).

At block 406, at least one of the system interfaces may be operated in some manner based, at least in part, on the established offset data (e.g., by operatively correcting a frequency of the local timing signal within at least the system interface based, at least in part, on the established offset data).

The methods and apparatuses provided herein may, therefore, provide timing signal frequency management that allows multiple technologies (including a GPS/GNSS system interface) to use a single VCTCXO in a multimode/interface system. Here, for example, a GPS/GNSS system interface may utilize established offset data (e.g., in a frequency control loop, etc.) to possibly improve sensitivity. Certain frequency control loops may not be fast enough to compensate for changes in VCTCXO frequency, which may result in degradation of performance. In certain devices, certain system interfaces/features, such as GSM/GNSS, WCDMA, CDMA idle, etc. may not have frequency control loops and/or the like running at the time GPS/GNSS system interface may be operational. As such, thermal frequency changes in a VCTCXO may not adequately corrected during a GPS/GNSS session, which may lead to degraded GPS/GNSS performance. Frequency manager 240 may, however, access one or more available frequency error estimates from various system interfaces to establish offset data 252 that may be utilized for frequency corrections in the GPS/GNSS system interface.

Thus, frequency manager 240 may correct frequency transients as observed via GPS/GNSS signals due to the thermal effects. The offset information (e.g., estimated and/or measured frequency error data, etc.) available from other system interfaces and/or circuitry that may be controlling an oscillator circuit (e.g., a VCTCXO, etc.). Such offset information may include, for example, a frequency estimate of VCTCXO error with regard to an external signal. Such external signal may, for example, be subject to Doppler and/or other like effects from movement of the device. Such offset information may, for example, include frequency estimates available from a GPS/GNSS signal processor/engine associated with individual GPS/GNSS SV measurements, position fix computations, etc. Frequency manager 240 may, for example, use such frequency estimates to establish offset data (e.g., here, frequency corrections) that may be used in acquiring GPS/GNSS signals.

Thus, in certain example implementations, frequency manager 240 may be used in multimode systems to establish and provide offset data based, at least in part, on the best available offset information from various system interfaces to a GPS/GNSS system interface directly, rather than to a shared VCTCXO. Therefore both frequency error computation, as well as time/frequency/manner of application may be tailored to GPS/GNSS performance specifically.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

For example, in certain implementations established offset data 252 may be utilized in some manner by timing circuit 202 to make certain corrections to local timing signal 206, e.g., via oscillator circuit 204.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
    accessing at least one first offset information signal associated with a first system interface, said first offset information signal being based, at least in part, on a first wireless signal;
    accessing at least one second offset information signal not associated with said first system interface said second offset information signal being based, at least in part, on a second wireless signal;
    establishing at least one offset data signal based, at least in part, on at least one of said first offset information signal and/or said second offset information signal;
    adjusting a local timing signal based, at least in part, on said established offset data signal; and
    operating at least said first system interface with said adjusted local timing signal.

2. The method as recited in claim 1, wherein said second offset information signal is associated with at least a second system interface.

3. The method as recited in claim 2, further comprising:
    operating said second system interface with said adjusted local timing signal.

4. The method as recited in claim 1, wherein said second offset information signal is further based, at least in part, on said local timing signal.

5. The method as recited in claim 4, wherein said second offset information signal is associated with at least a second system interface, and said second system interface comprises a second wireless system interface operatively enabled to receive said second wireless signal.

6. The method as recited in claim 1, wherein said established offset data signal comprises an estimated frequency error signal associated with said local timing signal.

7. The method as recited in claim 6, wherein said local timing signal is based, at least in part, on a signal from a controlled oscillator circuit.

8. The method as recited in claim 7, further comprising:
    operating said controlled oscillator circuit based, at least in part, on said established offset data signal.

9. The method as recited in claim 1, where said first system interface comprises a first wireless system interface, and further comprising:
    establishing said first offset information signal based, at least in part, on a received first wireless signal and a local timing signal.

10. The method as recited in claim 9, wherein:
    adjusting a local timing signal comprises operatively correcting a frequency of said local timing signal within at least said first system interface.

11. The method as recited in claim 1, further comprising:
    identifying uncertainty information for each of at least said first offset information signal and said second offset information signal; and
    wherein establishing said offset data signal further comprises establishing said offset data signal based, at least in part, on said uncertainty information.

12. The method as recited in claim 11, wherein said second offset information signal is associated with at least a second system interface, and said uncertainty information is based, at least in part, on at least one of:
    an age associated with at least one of said first offset information signal and/or said second offset information signal,
    an operating state and/or an operating parameter associated with at least one of said first system interface and/or second system interface, and/or
    a condition associated with a device comprising at least said first system interface and said second system interface.

13. The method as recited in claim 1, wherein establishing said offset data signal comprises comparing a plurality of offset information signals, said plurality of offset information signals comprising at least said first offset information signal and second offset information signal, and establishing said offset data signal based, at least in part, on one of said plurality of offset information signals.

14. The method as recited in claim 1, wherein establishing said offset data signal comprises combining at least a portion of a plurality of offset information signals to establish a combined offset information signal, said plurality of offset information signals comprising at least said first offset information signal and second offset information signal, and establishing said offset data signal based, at least in part, on said combined offset information signal.

15. The method as recited in claim 1, wherein said first system interface comprises an SPS signal receiver.

16. The method as recited in claim 15, wherein operating at least said first system interface with said adjusted local timing signal comprises:
    operatively enabling a frequency converting circuit within said SPS signal receiver based, at least in part, on said established offset data signal.

17. An apparatus comprising:
    a timing circuit operatively enabled to generate a local timing signal;
    a first system interface operatively coupled to said timing circuit;
    a second system interface operatively coupled to said timing circuit; and
    a frequency manager operatively enabled to access at least first offset information associated with said first system interface and second offset information associated with said second system interface, and establish offset data based, at least in part, on at least one of said first offset information and/or said second offset information, and wherein at least one of said first system interface and/or said second system interface are operatively enabled to operate using said local timing signal based, at least in part, on said established offset data.

18. The apparatus as recited in claim 17, wherein said established offset data comprises an estimated frequency error associated with said local timing signal.

19. The apparatus as recited in claim 18, wherein said timing circuit comprises a controlled oscillator circuit.

20. The apparatus as recited in claim 17, where said first system interface comprises a first wireless system interface, and said first offset information is based, at least in part, on a received first wireless system signal and said local timing signal.

21. The apparatus as recited in claim 20, wherein at least one of said first system interface and/or said second system interface are operatively enabled to at least internally operatively correct a frequency of said local timing signal based, at least in part, on said established offset data.

22. The apparatus as recited in claim 17, wherein said second offset information is based, at least in part, on said local timing signal.

23. The apparatus as recited in claim 22, wherein said second system interface comprises a second wireless system interface, and said second offset information is based, at least in part, on a received second wireless system signal and said local timing signal.

24. The apparatus as recited in claim 17, wherein said frequency manager is operatively enabled to identify uncertainty information for each of at least said first offset information and said second offset information, and establish said offset data based, at least in part, on said uncertainty information.

25. The apparatus as recited in claim 24, wherein said uncertainty information is based, at least in part, on at least one of:
  an age associated with at least one of said first offset information and/or said second offset information,
  an operating state and/or an operating parameter associated with at least one of said first system interface and/or second system interface, and/or
  a condition associated with a device comprising at least said first system interface and said second system interface.

26. The apparatus as recited in claim 17, wherein said frequency manager is operatively enabled to compare a plurality of offset information, said plurality of offset information comprising at least said first offset information and second offset information, and establish said offset data based, at least in part, on one of said plurality of offset information.

27. The apparatus as recited in claim 17, wherein said frequency manager is operatively enabled to combine at least a portion of a plurality of offset information to establish combined offset information, said plurality of offset information comprising at least said first offset information and second offset information, and establish said offset data based, at least in part, on said combined offset information.

28. The apparatus as recited in claim 17, wherein said first system interface comprises an SPS signal receiver.

29. The apparatus as recited in claim 28, wherein said SPS signal receiver comprising a frequency converting circuit that is operatively enabled based, at least in part, on said established offset data.

30. The apparatus as recited in claim 17, wherein said frequency manager comprises at least one processing unit.

31. An article comprising
  a non-transitory computer readable medium having stored thereon computer implementable instructions that if implemented by one or more processing units operatively enable the one or more processing units to:
  access at least first offset information associated with a first system interface and second offset information associated with a second system interface; and
  establish offset data based, at least in part, on at least one of said first offset information and/or said second offset information, said offset data being for use by at least one of said first system interface and/or said second system interface to operatively adjust said local timing signal.

32. The article as recited in claim 31, wherein said established offset data comprises an estimated frequency error associated with said local timing signal.

33. The article as recited in claim 32, wherein said local timing signal is generated using a controlled oscillator circuit.

34. The article as recited in claim 31, where said first system interface comprises a first wireless system interface, and said first offset information is based, at least in part, on a received first wireless system signal and said local timing signal.

35. The article as recited in claim 34, wherein at least one of said first system interface and/or said second system interface are operatively enabled to at least internally operatively correct a frequency of said local timing signal based, at least in part, on said established offset data.

36. The article as recited in claim 31, wherein said second offset information is based, at least in part, on said local timing signal.

37. The article as recited in claim 36, wherein said second system interface comprises a second wireless system interface, and said second offset information is based, at least in part, on a received second wireless system signal and said local timing signal.

38. The article as recited in claim 31, wherein said computer implementable instructions, if implemented by the one or more processing units, operatively enable the one or more processing units to:
  identify uncertainty information for each of at least said first offset information and said second offset information; and
  establish said offset data based, at least in part, on said uncertainty information.

39. The article as recited in claim 38, wherein said uncertainty information is based, at least in part, on at least one of:
  an age associated with at least one of said first offset information and/or said second offset information,
  an operating state and/or an operating parameter associated with at least one of said first system interface and/or second system interface, and/or
  a condition associated with a device comprising at least said first system interface and said second system interface.

40. The article as recited in claim 31, wherein said computer implementable instructions, if implemented by the one or more processing units, operatively enable the one or more processing units to:
  compare a plurality of offset information, said plurality of offset information comprising at least said first offset information and second offset information; and
  establish said offset data based, at least in part, on one of said plurality of offset information.

41. The article as recited in claim 31, wherein said computer implementable instructions, if implemented by the one or more processing units, operatively enable the one or more processing units to:
- combine at least a portion of a plurality of offset information to establish combined offset information, said plurality of offset information comprising at least said first offset information and second offset information; and
- establish said offset data based, at least in part, on said combined offset information.

42. The article as recited in claim 31, wherein said first system interface comprises an SPS signal receiver.

43. An apparatus comprising:
- means for accessing first offset information associated with a first system interface;
- means for accessing second offset information associated with at least a second system interface;
- means for establishing offset data based, at least in part, on at least one of said first offset information and/or said second offset information; and
- means for enabling at least one of said first system interface and/or said second system interface to operatively adjust a locally generated timing signal based, at least in part, on said established offset data.

44. The apparatus as recited in claim 43, wherein said established offset data comprises an estimated frequency error associated with said locally generated timing signal.

45. The apparatus as recited in claim 44, wherein said locally generated timing signal is based, at least in part, on a signal from a controlled oscillator circuit.

46. The apparatus as recited in claim 43, where said first system interface comprises a first wireless system interface, and further comprising:
- means for establishing said first offset information based, at least in part, on a received first wireless system signal and said locally generated timing signal.

47. The apparatus as recited in claim 46, further comprising:
- means for operatively correcting a frequency of said locally generated timing signal within at least said first system interface based, at least in part, on said established offset data.

48. The apparatus as recited in claim 43, wherein said second offset information is based, at least in part, on said locally generated timing signal.

49. The apparatus as recited in claim 48, wherein said second system interface comprises a second wireless system interface, and said second offset information is based, at least in part, on a received second wireless system signal and said locally generated timing signal.

50. The apparatus as recited in claim 43, further comprising:
- means for identifying uncertainty information for each of at least said first offset information and said second offset information; and
- means for establishing said offset data based, at least in part, on said uncertainty information.

51. The apparatus as recited in claim 50, wherein said uncertainty information is based, at least in part, on at least one of:
- an age associated with at least one of said first offset information and/or said second offset information,
- an operating state and/or an operating parameter associated with at least one of said first system interface and/or second system interface, and/or
- a condition associated with a device comprising at least said first system interface and said second system interface.

52. The apparatus as recited in claim 43, further comprising:
- means for comparing a plurality of offset information, said plurality of offset information comprising at least said first offset information and second offset information; and
- means for establishing said offset data based, at least in part, on one of said plurality of offset information.

53. The apparatus as recited in claim 43, further comprising:
- means for combining at least a portion of a plurality of offset information to establish combined offset information, said plurality of offset information comprising at least said first offset information and second offset information; and
- means for establishing said offset data based, at least in part, on said combined offset information.

54. The apparatus as recited in claim 43, wherein said first system interface comprises an SPS signal receiver.

55. The apparatus as recited in claim 54, further comprising:
- means for operatively enabling a frequency converting circuit within said SPS signal receiver based, at least in part, on said established offset data.

* * * * *